US007020554B2

(12) United States Patent
Roduner et al.

(10) Patent No.: US 7,020,554 B2
(45) Date of Patent: Mar. 28, 2006

(54) METHOD OF REGULATING OR CONTROLLING A CYCLICALLY OPERATING INTERNAL COMBUSTION ENGINE

(75) Inventors: Christian Roduner, Graz (AT); Ingmar Schoegl, Graz (AT)

(73) Assignee: AVL List GmbH, Graz (AT)

( * ) Notice: Subject to any disclaimer, the term of this patent is extended or adjusted under 35 U.S.C. 154(b) by 110 days.

(21) Appl. No.: 10/725,335

(22) Filed: Dec. 2, 2003

(65) Prior Publication Data

US 2005/0027429 A1 Feb. 3, 2005

(30) Foreign Application Priority Data

Dec. 5, 2002 (AT) ............................ GM822/2002

(51) Int. Cl.
*B60T 7/12* (2006.01)

(52) U.S. Cl. ...................... 701/104; 701/109; 701/102; 701/105; 123/406.41

(58) Field of Classification Search ................ 701/104, 701/105, 109, 115, 102; 123/406.41, 406.18, 123/406.22, 612, 406.48
See application file for complete search history.

(56) References Cited

U.S. PATENT DOCUMENTS 5,623,412 A 4/1997 Masson et al. ............ 701/101
5,668,725 A * 9/1997 Naik .......................... 701/111
5,823,166 A * 10/1998 Entenmann et al. ... 123/406.58
6,827,063 B1 * 12/2004 Breitegger et al. .... 123/406.58

FOREIGN PATENT DOCUMENTS

| | | |
|---|---|---|
| DE | 19749814 | 5/1999 |
| EP | 1045123 | 10/2000 |
| EP | 1152128 | 11/2001 |
| WO | 0142641 | 6/2001 |

* cited by examiner

*Primary Examiner*—Andrew M. Dolinar
*Assistant Examiner*—Johnny H. Hoang
(74) *Attorney, Agent, or Firm*—Dykema Gossett PLLC

(57) ABSTRACT

A method of regulating or controlling a cyclically operating internal combustion engine using a computation model by which the cycle or portions of the cycle of the internal combustion engine is, or are, divided into individual parts and the operating condition within each cycle part is determined using measured values, stored and/or applied data in order to obtain actuating variables for operating the internal combustion engine. The time limits of the cycle parts are at least partially calculated as a function of at least one variable engine operating parameter. The operating status of an internal combustion engine can thus be determined readily and quickly while still with sufficient accuracy so as to obtain actuating variables suited for regulating or controlling the internal combustion engine using electronic control units available for series operation.

26 Claims, 1 Drawing Sheet

METHOD OF REGULATING OR CONTROLLING A CYCLICALLY OPERATING INTERNAL COMBUSTION ENGINE

BACKGROUND OF THE INVENTION

The invention relates to a method of regulating or controlling a cyclically operating internal combustion engine using a computation model by which the cycle or portions of the cycle of the internal combustion engine is, or are, divided into individual parts and the operating condition within each cycle part is determined using measured values, stored and/or applied data in order to obtain actuating variables for operating said internal combustion engine.

Internal combustion engines have seen many innovations in recent years such as turbochargers, exhaust gas recirculation, multiple injection and/or partially/fully variable valve timing control systems so that there has been a considerable increase in the number of actuating variables available for control. The possibilities resulting from combining the actuating variables are generally very complex and cannot be sufficiently ascertained using conventional global approaches such as mean value models or characteristics models.

The high demands for consumption, emissions and drivability on modern internal combustion engines call for control concepts that cannot be carried out without the current status of the engine being detected. Since many of the variables required for control can only be measured, if at all, using expensive sensors (meaning sensors that are not suited for series production), there is a compelling need for novel computation models.

The computing capacities within the engine control system are strongly limited, which places high demands on the real-time capacity of such computation models.

DESCRIPTION OF PRIOR ART

If at all, current methods of calculating the operating condition of an internal combustion engine meet the demands placed on modern control concepts with unsatisfactory results. The approaches used can be divided into three groups:

- numerical methods are based on numerical integration of the processes that are characteristic for the cycle over the duration thereof (e.g., four strokes=720° crank angle). Such type methods involve complex calculations and can therefore not be carried out in real time under the conditions prevailing when used in series.
- methods based on cylinder pressure make use of the cylinder pressure curve measured by a suited sensor and evaluated using appropriate thermodynamic methods for calculating the current operating status of the engine. However, the sensors that are available for performing such methods are too expensive to be used in series or are only suited for use on the test stand.
- further known methods rely on assumptions and/or limitations that are based on a certain configuration of the internal combustion engine. Such type models are only aimed at partial functions and cannot be generalized.

SUMMARY OF THE INVENTION

It is the object of the invention to develop a method by which the operating status of an internal combustion engine can be determined readily and quickly while still with sufficient accuracy so as to obtain actuating variables suited for regulating or controlling the internal combustion engine using electronic control units (ECU) available for series operation.

The solution to this object is achieved in that the computation models for the various individual cycle parts are based on at least partially different assumptions and/or have different simplifications and that the time limits of the cycle parts are at least partially calculated as a function of at least one variable engine operating parameter. The at least one variable engine operating parameter is measured or is dictated, depending on the operating status of the engine, by the electronic control unit (ECU) for example.

The important point of the invention is that it does not only simply reduce the intervals between the various computations. The limits of the cycle parts are not firmly bound to predetermined crank angles but are made dependent on predetermined engine operating parameters. The advantage that may thus be obtained is that even map controlled internal combustion engines with variable valve train mechanism, variable injection timing and the like may be mapped in a suitable manner. Appropriate simplifications, which permit complete analytical mapping, may be made within the various cycle parts, with said simplifications however not negatively affecting the quality of mapping as they are accurately adjusted to this part of the working cycle. What matters is that, within one cycle part, the operating conditions will not substantially change.

If for example a cycle part performs a portion of the intake stroke that starts with the intake valve opening completely and ends at a point where the intake valve is completely closed, one takes, as a simplification for the entire cycle part, the mean of the intake cross section, which facilitates modeling of the gas flow. Further, for each cycle part, as a simplification, the piston speed is assumed to be constant by approximation. The error resulting from this assumption will be retroactively compensated later.

The cycle parts may be defined by the complete open condition of the intake and/or exhaust valves, by the combustion process, by the direction of motion of the piston, by the compression process and/or by the expansion process. The limits of the cycle parts can be determined by the position of the intake and/or exhaust valves and by the beginning or end of the combustion process or processes.

The solution that can be carried out for any crank angle is calculated by portions starting with an initial condition defined at any transition between portions of the cycle, the operating status being calculated in one step at the end of a portion. The operating status may be determined in the same way for each of the crankshaft angles within this portion, though. As a result thereof, the time curve of the operating status may also be ascertained.

Since the processes described by comparative processes have already been defined analytically, more specifically algebraically, it is possible to detect the operating status of each cycle part in real time.

There is thus provided, in a further implementation of the invention, that the operating status at the end of the preceding cycle part be assigned to the initial conditions of the next cycle part.

The operating status is at least assigned one variable from the group comprising torque, mass flow, in-cylinder charge condition, energy of the exhausts and heat flow in the cylinders.

Depending on the operating status to be ascertained, at least one engine operating parameter selected from the group comprising intake pressure, intake temperature, gas composition in the suction pipe, exhaust pressure, exhaust temperature, composition of the exhaust in the exhaust elbow, parameters of the valve train mechanism, combustion parameters as well as general engine operating parameters such as engine speed and wall temperature can be calculated. To obtain this result, it is not necessary to measure all of the engine operating parameters for it is also possible to use, in parts, results obtained from algorithms. To improve the accuracy of the computation process, there may be provided that at least one engine operating parameter be determined analytically and by measurement and that computed values be aligned in a well known manner, with preferably at least one engine parameter selected from the group comprising mass flow, in-cylinder pressure, air-fuel ratio and torque being determined analytically and by measurement.

In order to simplify the computation process, there is provided that the effective cross-sectional area of flow of the valves be approximated by a rectangular or stepped curve.

With the flexible division of the cycle, the computation process is not bound to the type of valve train mechanism used (fixed, partially/fully variable; number of intake and exhaust valves). Various combustion processes (compression or spark ignition; number of partial combustions) only differ by the analytical solution of the portions performing the combustion. Computation functions independent of the configuration of the internal combustion engine and is affected neither by the use of pressure stages (compressors, turbines, and so on) nor by devices for internal or external exhaust gas recirculation.

The method includes methodology permitting computation of conditions for which conventional methods require numerical integration without such an integration. The processes involved in charge changing and combustion are generally characterized by time-variant parameters (e.g., valve lift, combustion history, . . . ). These time variables are approximated by simplified curves (e.g., rectangular curves), which permits to clearly define cycle parts. The interval boundaries are flexible although they are a priori known by the interval definition. The cycle parts are no longer dependent on the time variation of actuating variables, meaning on charge changing and combustion history, and can be evaluated analytically.

BRIEF DESCRIPTION OF THE DRAWINGS

The invention will be described in closer detail herein after with reference to the Figs in which.

DETAILED DESCRIPTION OF THE PREFERRED IMPLEMENTATIONS

EXAMPLE

Figure 1:
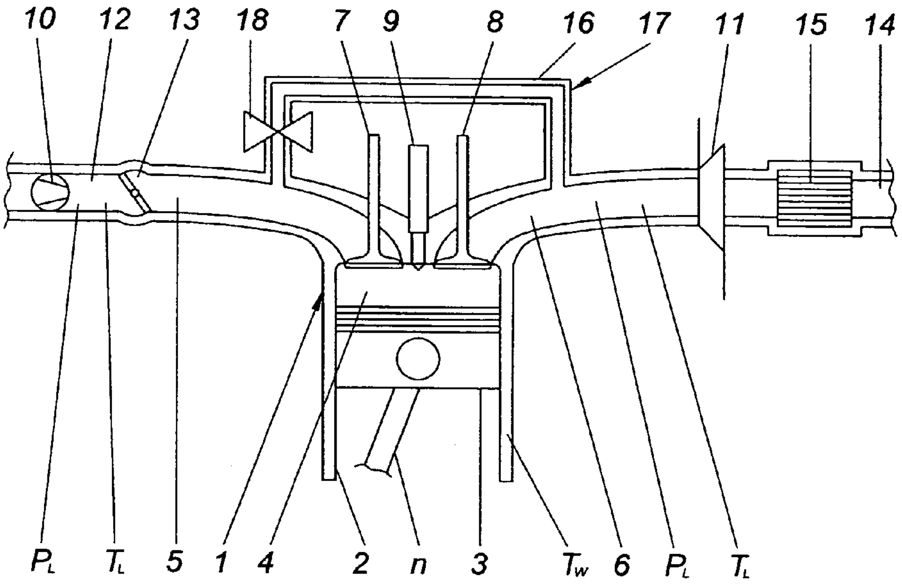
FIG. 1 is a schematic illustration of an internal combustion engine for carrying out the method of the invention.

Charge Model for Variable Valve Train Mechanism

The following assumptions and simplifications are made:

- the intake stroke is observed; the gas condition at the exhaust is the initial condition (in the alternative, also with exhaust stroke)
- calculation of the charge condition (overall mass, temperature, composition, pressure) depending on valve timing and the current operating point of the engine (speed, wall temperature) for any crank angle (i.e., its curve as well).
- effective valve cross-sections are approximated by rectangular/stepped curves
- portions with different open/closed configurations of the intake/exhaust valves are dealt with separately.
- each portion can be calculated in one step from operating parameters and the end condition of the preceding portion.
- mean value model within the portion (no integration within one portion).

The method is based on differential equations for the enthalpy variation with time of a cylinder:

$$dH_{cyl}/dt=Q^*_{wall}+V_{cyl}dp_{cyl}/dt+\Sigma H^*_i \quad (1)$$

and after conversion:

$$dp_{cyl}/dt=1/V_{cyl}(-\kappa p_{cyl}dV_{cyl}/dt+(\kappa-1)Q^*_{wall}+\kappa R\Sigma T_i m^*_i) \quad (2)$$

Derivation for simplified case:

The following simplifications are made first:

constant piston speed: $dV_{cyl}/dt=A_o c_m$ (3)

linear expression of mass flow: $m^*_i=k_{T,i}(p_i-p_{cyl})$ (4)

linear expression of heat flow: $Q^*_{wall}=k_w A_{cyl} p_{cyl}$ (5)

Substitution yields:

$$dp_{cyl}/dt=p_{cyl}/V_{cyl}(-\kappa A_o c_m+(\kappa-1)k_w A_{cyl}-\kappa R\Sigma T_i k_{T,i})+\kappa R/V_{cyl}\Sigma p_i T_i k_{T,i} \quad (6)$$

wherein $H_{cyl}$ is the enthalpy of the cylinder $Q^*_{wall}$ is the wall heat flux $V_{cyl}$ is the cylinder volume $H^*_i$ is the enthalpy flux through $i^{th}$ valve $\kappa$ is the isentropic exponent R is the gas constant and $T_i$ is the temperature of the incoming gas flowing through the $i^{th}$ valve $A_o$ is the piston surface $c_m$ is the mean piston speed $p_{cyl}$ is the cylinder pressure $k_w$ is the heat transfer coefficient $k_{T,i}$ is the linearity factor, $m^*_i$ is the mass flowing through $i^{th}$ valve The solution of the simple differential equation is:

$$p_{cyl}=[p_{cyl,0}-p_\infty](V_{cyl}/V_{cyl,0})\hat{}k^- +p_\infty \quad (7)$$

with: $p_\infty=-(\kappa R)/(k^- A_o c_m)\Sigma p_i T_i k_{T,i}$ (8)

$$k^-=-\kappa+(\kappa-1)k_w A_{cyl})/(c_m A_o)-(\kappa R)/(c_m A_o)\Sigma T_i k_{T,i} \quad (9)$$

The solution for the cylinder pressure consists of two parts:

- the constant pressure (negative pressure for maintaining the mass flow)
- "polytropic" for departure from the initial condition The solution for the entire air mass $m_{cyl}$ through cylinder (2) is obtained by integration from equation (4)

$$m_{cyl}=\int\Sigma m^*_i dt=\int\Sigma k_{T,i}(p_i-p_{cyl})dt \quad (10)$$

For derivation, simplifications were used that depart from real system properties and need therefore to be corrected retroactively:

constant piston speed
linear throttle equation

The points where corrections are to be made can be defined by comparing the approximation solution to the numerical solutions of the corresponding simple differential equations.

i) Real Piston Speed (for Linearized Throttle Equation)

Substituting in the above indicated solution of equation (7) the real piston speed $c_m$ for the mean piston speed, the numerical solution for low speeds can be approximated quite accurately. Generally, this however calls for a speed dependent correction simulating the lags resulting from the time variation of the piston speed.

ii) Throttle Equation (for Constant Piston Speed)

Depending on the linearization rule $k_{T,i}$ for throttle equation (4) various pressure differences are obtained, which are needed for maintaining the mass flow. The pressures, which differ while the volume is the same, result in air mass deviations. A correction can be made using a conversion rule for the pressure difference calculated for the linearized case.

Figure 4:
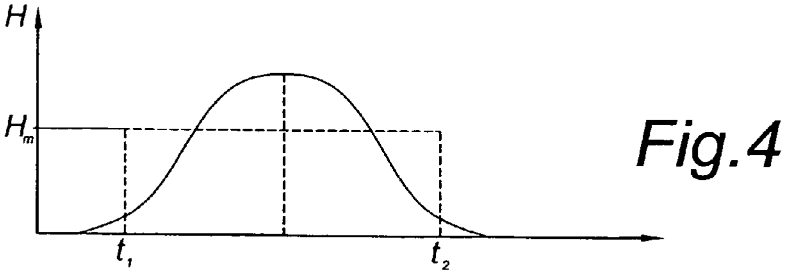
FIG. 4 is a valve lift diagram.

FIG. 4 depicts an example of how the effective valve cross-section is approximated by a mean valve cross-section. For this purpose, the effective valve lift H is approximated by a rectangular lift curve $H_m$ that is equal in area. For the beginning and the end of the cycle part, a time $t_1$ and $t_2$ may respectively be defined at which the valve lift H of the charge changing valve amounts to 10% of the total lift.

The internal combustion engine 1 for carrying out the method which is schematically illustrated in FIG. 1 comprises at least one piston 3 that reciprocates in a cylinder 2 and defines a combustion chamber 4 provided with at least one intake manifold 5 and at least one exhaust manifold 6 discharging therein and therefrom respectively. The intake manifold 5 is controlled by an intake valve 7 and the exhaust manifold 6 by an exhaust valve 8. A fuel injection equipment 9 directly discharges into the combustion chamber 4. As an alternative to, or in addition to, the fuel injection equipment 9 an ignition equipment may discharge into the combustion chamber 4. The compressor member is labeled at 10, the turbine member of an exhaust gas turbocharger at 11. A throttle device 13 is disposed within the suction pipe 12.

Downstream of the turbine 11 there is provided an exhaust cleaning device 15 in the exhaust leg 14. Upstream of the turbine 11, an exhaust gas recirculation line 16 of an exhaust gas recirculation 17 is connected in branching relation to the exhaust leg 14, said recirculation line discharging into the suction pipe 12 downstream of the compressor 10 and of the throttle device 13. An exhaust recirculation valve is indicated at 18.

A change in the arrangement of the optional components exhaust gas recirculation 17, compressor 10, throttle device 13, turbine 11 and exhaust cleaning device 15 will not influence the computation method.

In the suction pipe 12, pressure $p_L$, temperature $T_L$ and/or the composition of the intake gas are measured. Pressure $p_A$, temperature $T_A$ and/or composition of the exhaust gas are measured in the exhaust elbow of the exhaust leg 14. Further, the parameters of the valve train mechanism of the intake valves 7 and of the exhaust valves 8 are determined, namely the control times, the effective cross sectional area of flow of the intake valves 7 and of the exhaust valves (as a function of the valve lift curve). The combustion parameters, namely the control times (injection timing, ignition timing) and the amount of fuel are determined. Further, general engine operating parameters such as engine speed n and cylinder wall temperature $T_w$ are ascertained. Some of these operating variables can be determined algorithmically so that not all of the operating variables need to be actually measured. The cylinder pressure $p_{cyl}$ needs not be measured. The operating status of the internal combustion engine 1 is described by the following operating parameters: torque, mass flow, in-cylinder charge (air mass, pressure, temperature and gas composition), energy content of the exhaust and wall heat flow.

For calculating the cycle of the internal combustion engine 1 in accordance with the present method, said cycle is divided into cycle parts 21 through 28, 31 through 38 that are described using simplified connections and each condition within a cycle part 21 through 28, 31 through 38 being analytically computed from the initial condition and the operating parameters of the respective one of the cycle parts 21 through 28, 31 through 38. Accordingly, the numerical integration of the entire cycle is replaced by the combination of integrals that have been solved portionwise first.

The computation models are thereby based on different assumptions and/or comprise different simplifications. The time limits of the cycle parts 21 through 28, 31 through 38 are calculated as a function of at least one measured engine parameter. An appropriate definition of the cycle parts 21 through 28, 31 through 38 is obtained on the basis of the position of the intake/exhaust valves 7, 8 or the sequence of the partial combustions. The following possibilities are thus provided: intake valve 7 and/or exhaust valve 8 are open or a plurality of intake/exhaust valves 7, 8 are open at the same time; one combustion or a plurality of superposed combustions; compression/expansion of the gas enclosed in the cylinder.

Figure 2:
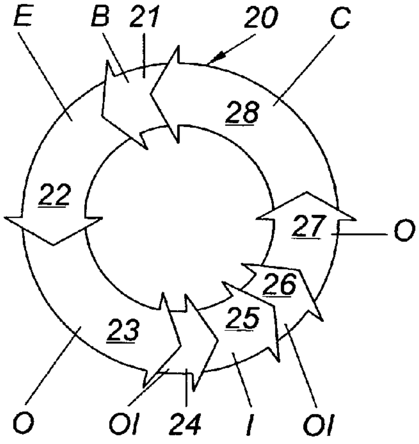
FIG. 2 shows a first exemplary implementation of the method in accordance with the invention.

FIG. 2 schematically outlines a first exemplary implementation of a cycle 20 of a four-stroke internal combustion engine with internal exhaust gas recirculation and one single combustion, said cycle being divided into several cycle parts 21 through 28. The cycle parts 21 through 28 are characterized by the processes of combustion B, expansion E, opening O of the exhaust valve 8, overlapping OI of intake valve 7 and exhaust valve 8, by opening I of intake valve 7 and by compression C of the gas within the combustion chamber 4. The cycle 20 shown in FIG. 2 comprises recirculating residual gas by causing the exhaust valve 8 to open again between intake phase I and compression phase C.

Figure 3:
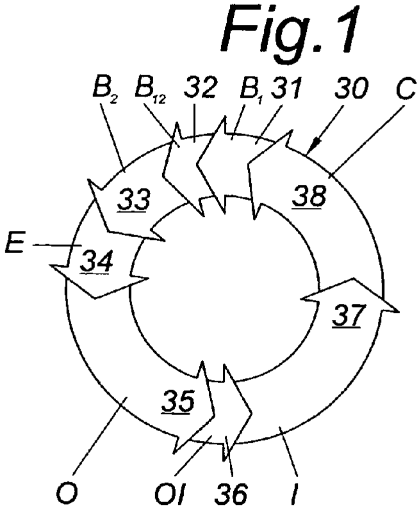
FIG. 3 shows a second exemplary implementation of the method in accordance with the invention.

FIG. 3 depicts a second exemplary implementation for a cycle 30 of a four-stroke internal combustion engine with fixed valve train mechanism, said cycle being divided into several cycle parts 31 through 38. In this case, the cycle 30 comprises two partial combustions $B_1$ and $B_2$ with the cycle part 32 between the two partial combustions $B_1$ and $B_2$ being defined as an overlapping phase $B_{1,\ 2}$ between the first combustion $B_1$ and the second combustion $B_2$.

The method in accordance with the invention can be used as a physical charge model with various configurations or combustion technologies, for example both with a standard valve train mechanism and a partially or fully variable valve train mechanism and with various combustion models. Further, models for detecting the gas condition in the suction pipe 12 and for detecting the gas condition in the exhaust leg 14 can also be used. The models mentioned can be used individually or in combination.

Within the scope of the invention, the gas condition can also be controlled by selectively varying the valve timing.

Further, combustion and exhaust gas composition with regard to $CO_2$, $NO_x$, particles, and so on can be controlled by selectively varying the amount of residual gas and/or the combustion parameters.

The accuracy of the method of calculation can be considerably enhanced by aligning the calculated parameters with measured parameters. It thus makes sense to compare and match the values calculated for mass flow $m_{cyl}$, cylinder pressure $p_{cyl}$, air-fuel ratio and torque with the values measured.

The method described permits to simply determine in real time the operating condition for any crank angle independent of the configuration of the internal combustion engine 1.

The invention claimed is:

1. A method of regulating or controlling a cyclically operating internal combustion engine using a computation model by which a cycle or portions of the cycle of the internal combustion engine is, or are, divided into individual cycle parts and an operating status within each cycle part is determined from at least one of measured values, stored and applied data in order to obtain actuating variables for operating said internal combustion engine, wherein the computation models for various individual cycle parts are based on at least partially different assumptions or have different simplifications and the time limits of the cycle parts are at least partially calculated as a function of at least one variable engine operating parameter, wherein computation models for the individual cycle parts evolve from an initial condition and algebraically calculate in one step computation variable during duration of the cycle part, wherein an operating status at an end of a cycle part is used as an initial condition for computing a next cycle part and wherein each operating status is defined by at least one variable selected from a group comprising torque, mass-flow, in-cylinder charge condition of the cylinders, energy content of exhausts and wall heat flow of at least one cylinder.

2. The method according to claim 1, wherein at least one limit of at least one cycle part is defined by at least one of a position of intake valves and a position of exhaust valves.

3. The method according to claim 1, wherein at least one cycle part is defined by a completely open condition of the intake and exhaust valves.

4. The method according to claim 1, wherein at least one limit of at least one cycle part is defined by a beginning of a combustion process.

5. The method according to claim 1, wherein at least one limit of at least one cycle part is defined by an ignition process of a fuel.

6. The method according to claim 1, wherein at least one limit of at least one cycle part is defined by an end of the combustion process.

7. The method according to claim 1, wherein at least one cycle part is defined by at least one combustion process.

8. The method according to claim 1, wherein at least one cycle part is defined by a direction of motion of a piston.

9. The method according to claim 1, wherein a limit of at least one cycle part is defined by a top dead center of a piston.

10. The method according to claim 1, wherein a limit of at least one cycle part is defined by a bottom dead center of a piston.

11. The method according to claim 1, wherein at least one cycle part is defined by the compression process of a gas enclosed in a cylinder.

12. The method according to claim 1, wherein at least one cycle part is defined by an expansion process of gas enclosed in a cylinder.

13. The method according to claim 1, wherein the computation of the computation variables of each cycle part is performed in real time.

14. The method according to claim 1, wherein at least one operating variable selected from a group comprising intake pressure, intake temperature and gas composition in a suction pipe is detected as an engine operating parameter.

15. The method according to claim 1, wherein at least one operating variable selected from a group comprising exhaust pressure, exhaust temperature and exhaust composition in a exhaust elbow is detected as an engine operating parameter.

16. The method according to claim 1, wherein at least one parameter of a valve train mechanism selected from the group consisting of timing of intake valves, timing of exhaust valves, effective cross-sectional area of flow of the intake valves and effective cross-sectional areas of flow of the exhaust valves is detected as an engine operating parameter.

17. The method according to claim 16, wherein the effective cross sectional areas of flow of the intake and the exhaust valves are approximated by a rectangular or stepped curve.

18. The method according to claim 1, wherein at least one parameter of combustion selected from the group consisting of injection timing, ignition time and an amount of fuel injected is detected as an engine operating parameter.

19. The method according to claim 1, wherein at least one of an engine speed and a cylinder wall temperature is determined as an engine operating parameter.

20. The method according to claim 1, wherein at least one engine operating parameter is analytically determined.

21. The method according to claim 1, wherein at least one engine operating parameter is determined by measurement.

22. The method according to claim 1, wherein at least one engine operating parameter is determined analytically and by measurement and computed and measured values are aligned.

23. The method according to claim 22, wherein at least one engine operating parameter selected from the group consisting of mass flow, cylinder pressure, air-fuel ratio and torque are determined analytically and by measurement.

24. The method according to claim 16, wherein the effective cross sectional areas of flow of the intake and exhaust valves are approximated by a mean cross-sectional area of flow.

25. The method according to claim 1, wherein, for deducing equations for computation variables, effective piston speed is approximated by a mean piston speed in at least one cycle part.

26. The method according to claim 25, wherein an error resulting from an assumption of a mean piston speed is compensated resolving the equations of the computation variables.

* * * * *